(No Model.)
M. SCHMITZ.
COMBINED TRUCK AND WIRE STRETCHER.
No. 468,182. Patented Feb. 2, 1892.
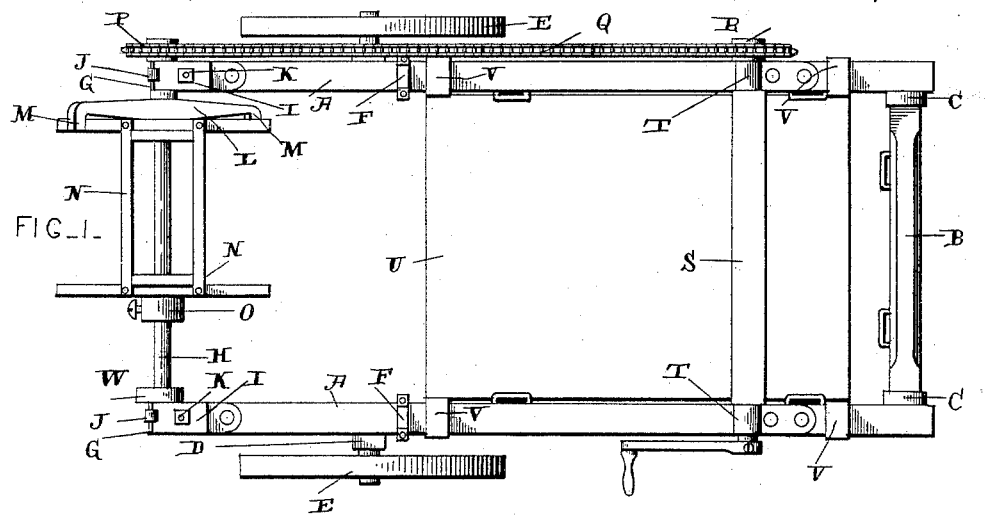
Fig. 1.
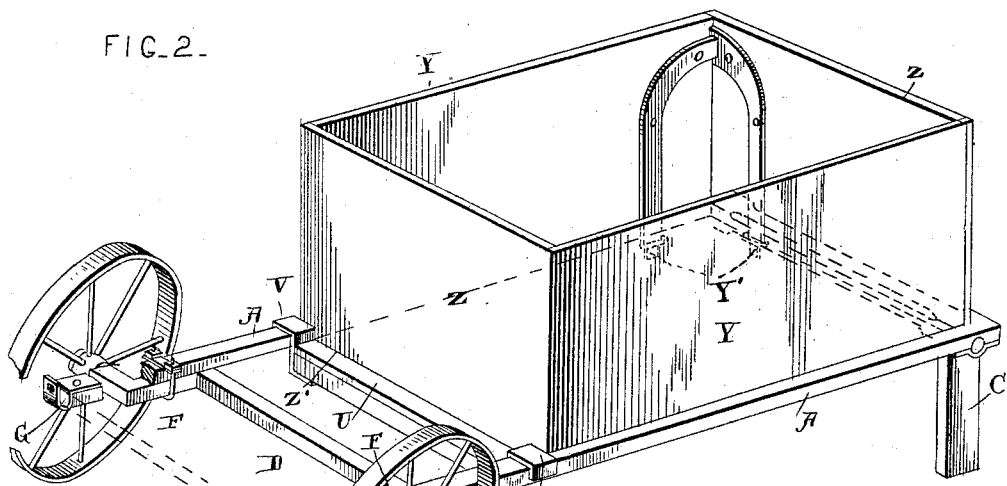
Fig. 2.
Fig. 3.
Fig. 4.
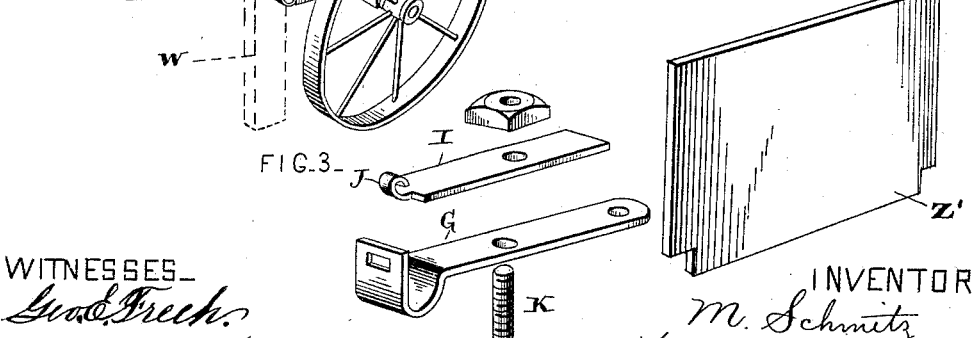
WITNESSES
Geo. E. Freeh.
R. Fitzgerald
INVENTOR
M. Schmitz
per
Lehmann & Pattison
Attys.

UNITED STATES PATENT OFFICE.

MICHAEL SCHMITZ, OF URBANA, IOWA.

COMBINED TRUCK AND WIRE-STRETCHER.

SPECIFICATION forming part of Letters Patent No. 468,182, dated February 2, 1892.

Application filed September 2, 1891. Serial No. 404,557. (No model.)

*To all whom it may concern:*

Be it known that I, MICHAEL SCHMITZ, of Urbana, in the county of Benton and State of Iowa, have invented certain new and useful Improvements in a Combined Truck and Wire-Stretcher; and I do hereby declare the following to be a full, clear, and exact description of the invention, such as will enable others skilled in the art to which it pertains to make and use it, reference being had to the accompanying drawings, which form part of this specification.

My invention relates to an improvement in combined trucks and wire-stretchers; and it consists in certain novel features of construction and in the combination and arrangement of parts, which will be fully described hereinafter, and more particularly referred to in the claim annexed.

The object of my invention is to construct a device which will wind or unwind fence or other wire and which when not desired for this purpose can be used as a truck for hauling barrels, &c., which it is desired to transport from one place to another.

In the accompanying drawings, Figure 1 is a plan view of the device when used for winding wire. Fig. 2 is a perspective view of the same when used for hauling barrels. Fig. 3 is a detached view of one of the shaft-bearings. Fig. 4 is a detail view of one of the ends Z of the box.

A represents two side bars, which are secured together at their rear ends by the cross-piece B, and to this portion B are secured the legs or supports C.

D represents the axle, which has its ends bent at right angles, as here shown, and which is supported on the wheels E.

F represents clamps, which extend around the side bars A and the angular end portions of the axle. It will be understood that these clamps may be loosened and the side bars adjusted on the axle at will.

Upon the outer ends of the bars A are secured the hook-bearings G, in which revolves the spool-shaft H. The shaft is held in position in these bearings by the plates I, having the reduced bent ends J, which pass through perforations in the outer ends of the bearings G. The inner ends of these plates are constructed with openings which fit over set-screw K.

Rigidly secured to the shaft is the clutch L, having projections M, which engage the spool N and prevent it from turning on the shaft. The spool is held against this clutch by the adjustable stop O.

Secured to one end of the shaft H is the sprocket-wheel P, which is connected by means of the drive-chain Q to the sprocket-wheel R on the crank-shaft S, mounted on the bars A near their rear ends. The shaft S turns in bearings T, which may be removed from the bars A, when desired, by removing the securing-bolts T'.

U represents a platform, which is suspended within the frame by the hangers V, which catch over the side bars A. As these hangers are loosely connected to the said bars it will be seen that the platform may be moved back and forth within the said frame at will.

W represents a leg, which is mounted on the shaft H for supporting that end of the device when it becomes overbalanced by the weight of the spool. When it is desired to wind wire upon the spool, the shaft H is revolved through the medium of the crank-shaft and the drive-chain. When the spool has become full, the whole device may be moved to any desired point and the spool removed from the shaft H.

When it is desired to use the device for moving barrels, the shafts H and S and the plates I are removed from the frame. The hooks G are then free to engage the handles of a barrel or other object, which may be raised from the ground and transported to any point desired. The axle being adjustable on the frame, it may be moved out quite close to the hooks G and thus give the operator a greater leverage on the barrel.

The suspended platform is very convenient for holding tools or for standing upon for driving fence-posts.

I also provide the barrel-carrier with sides Y and end gates Z, which are secured to the sides and which have reduced lower ends Z', which fit down in the frame of the carrier and thus hold the sides and ends securely in place. Staples are also placed in the sides, which are engaged by the projections Y' of the sides and which assist greatly in holding the frame in place.

Having thus described my invention, I claim—

In a device of the character described, the combination, with the wheels, the axle, and the frame adjustably secured to the axle, of hook-bearings G, secured to the outer end of the frame and provided with openings in their upturned ends, clamping-plates K, having hooks J, which enter the said openings in the bearings and which are secured at their opposite ends to the frame, shaft H, journaled in the bearings, a spool secured to the shaft, and means for revolving the shaft, substantially as shown and described.

In testimony whereof I affix my signature in presence of two witnesses.

MICHAEL SCHMITZ.

Witnesses:
GEO. MOORE,
WILL BURRELL.